United States Patent [19]

Nordskog

[11] 4,073,369

[45] Feb. 14, 1978

[54] BRAKE AND TIE-DOWN MECHANISM

[75] Inventor: Robert A. Nordskog, Tarzana, Calif.

[73] Assignee: Nordskog Company Inc., Van Nuys, Calif.

[21] Appl. No.: 759,407

[22] Filed: Jan. 14, 1977

[51] Int. Cl.² .............................................. B60T 1/14
[52] U.S. Cl. ........................................ 188/5; 188/32
[58] Field of Search ..................... 188/2 R, 5, 21, 32

[56] References Cited

U.S. PATENT DOCUMENTS

| | | | |
|---|---|---|---|
| 3,701,396 | 10/1972 | House | 188/32 X |
| 3,710,895 | 1/1973 | Freedman | 188/32 X |

Primary Examiner—Duane A. Reger
Attorney, Agent, or Firm—Robert E. Geauque

[57] ABSTRACT

A mechanism providing both a brake and tie-down mechanism for a cart which utilizes a central support below the bottom of the cart for supporting both the vertically moving brake shoes and the rotating locks of the tie-down mechanism, and foot pedals at opposite ends of the cart for engaging and disengaging the brake shoes with the supporting surface and for rotating the locks to release the cart from the tie-down mechanism, the tie-down mechanism being arranged to receive a tie-down mushroom from either end of the cart.

10 Claims, 14 Drawing Figures

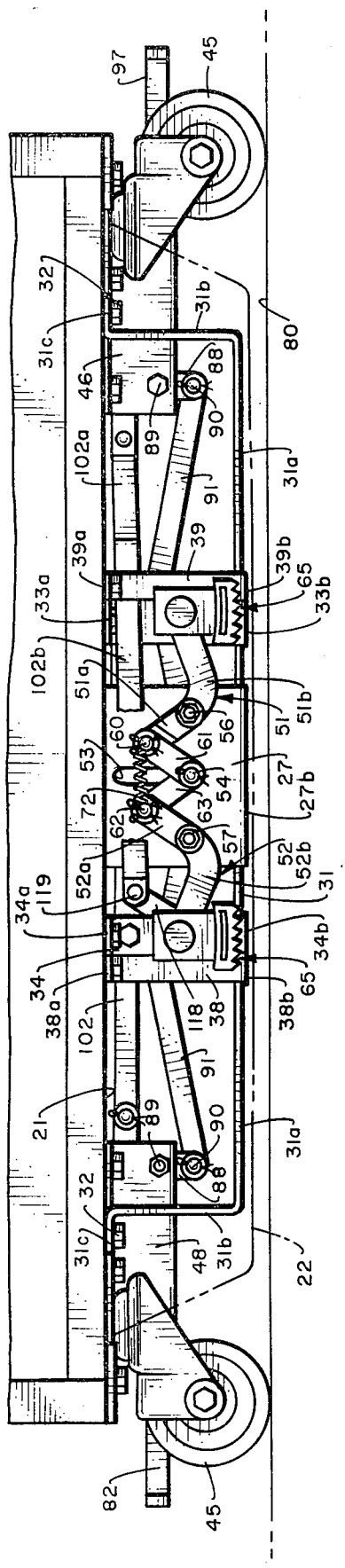
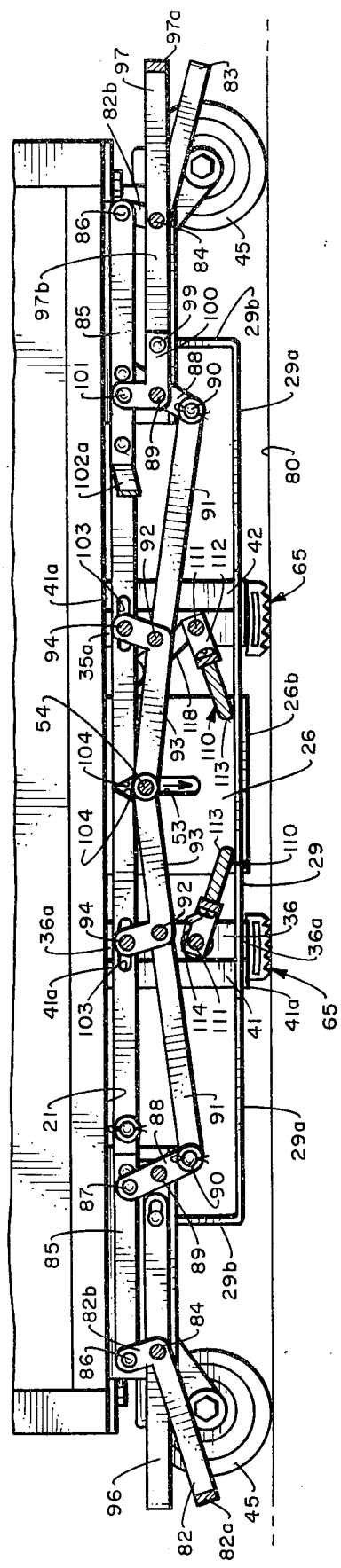
Fig. 2.
Fig. 7.

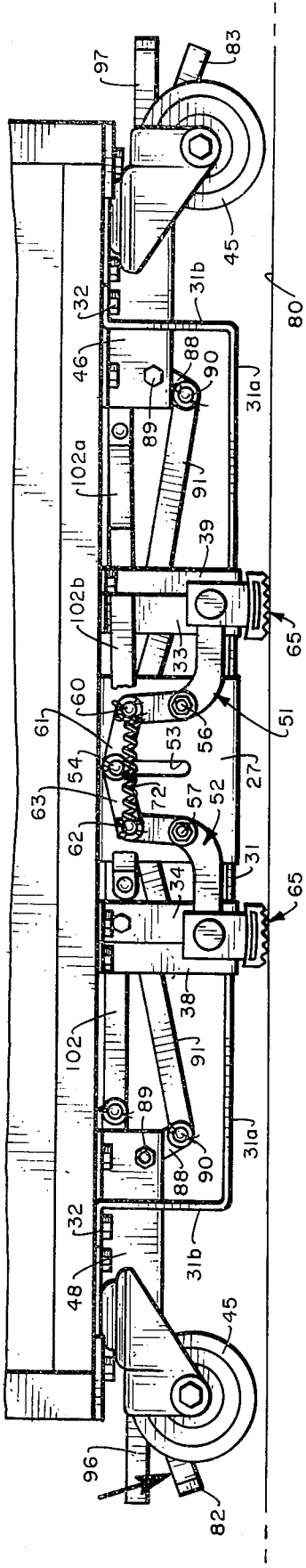
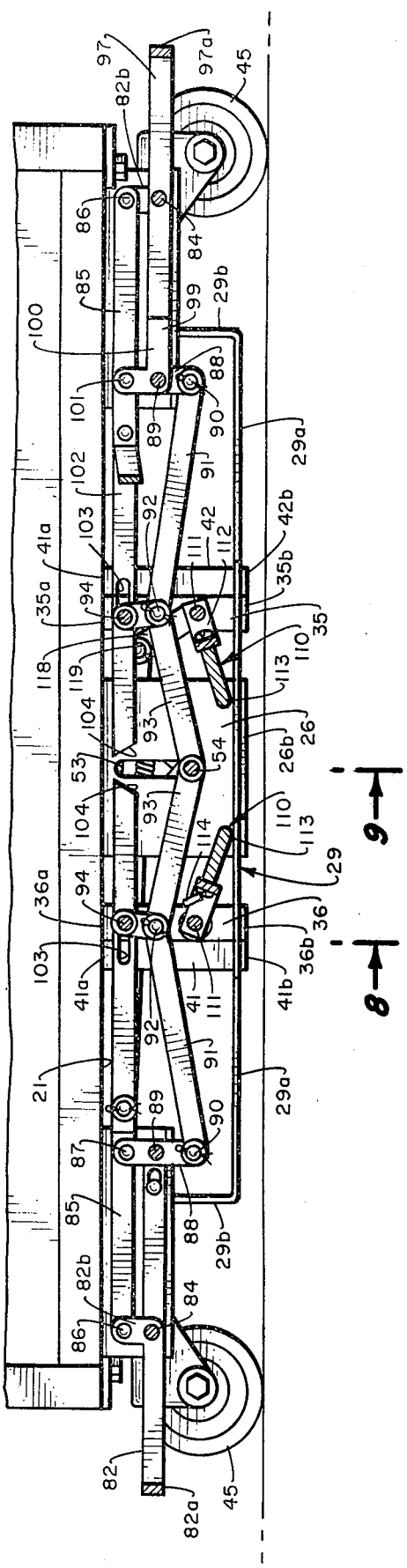
Fig. 3.
Fig. 4.

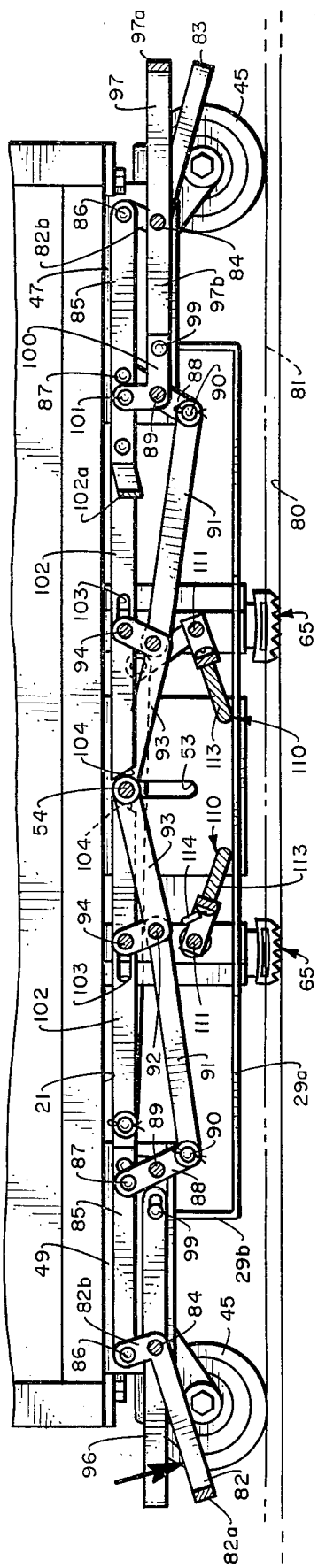

BRAKE AND TIE-DOWN MECHANISM

BACKGROUND OF THE INVENTION

A serving cart is employed in aircraft to serve food and drink to the passengers seated along the length of the aisle of the aircraft. These carts can be provided with brakes to hold the cart in position in the aisle, especially when rough weather is encountered. In order to make the braking means more accessible to the stewardesses, the brake pedal which operates the brake is preferably located at one end of the cart for operation by the attendant's foot, as shown in U.S. Pat. No. 3,987,871 assigned to the same Assignee. This brake can be released by further downward movement of the pedal by the toe rather than by an upward movement which is more difficult. In the braking mechanism of this prior patent, pivotally mounted braking feet move downwardly to engage the floor and lift one end of the cart off the floor. By locating the braking mechanism at one end of the cart, the standard tie-down mechanism is not accessible from that end of the cart. Such tie-down mechanisms are commonly used in the galley area instead of the braking mechanism supplied on the cart. Thus, it is desirable that the cart braking mechanism not interfere with the operation of the tie-down mechanism from either direction. The tie-down mechanism utilizes a mushroom secured to the floor and the cart moves over the mushroom from either end.

SUMMARY OF THE INVENTION

The braking and tie-down mechanisms of the present invention permits a cart to be moved over a tie-down mushroom from either end and to utilize the tie-down mechanism at such locations as the mushrooms are present. In addition, the braking mechanism can be operated when the cart is at other locations, such as in the aisle, without interference from the tie-down mechanism. The brake can be applied from either end of the cart by a brake pedal which is pushed down by the foot of the attendant. Also, the brake can be released from either end of the cart by pushing down on a separate release pedal connected to the release mechanism. This same release mechanism also releases the cart from the tie-down mushroom so that the cart can move away from the mushroom in the reverse direction from which it was pushed onto the mushroom. The release mechanism serves to simultaneously release the brake mechanism and to release the tie-down mechanism so that the cart can be moved to its next desired location, regardless of whether the cart has been restrained by the brake mechanism or the tie-down mechanism.

The support means for the tie-down locks which restrain the mushroom at the center of the cart also serve as support for the brake arms which engage the floor so that the same support means located centrally below the cart incorporates both mechanisms. The braking mechanism consists of two braking arms on each side of the center support means to provide a total of four braking arms, each of which has a brake foot pivotally mounted at the end thereof for engagement with the floor surface. The two brake arms on each side of the supporting structure are connected together by a spring and an overcenter linkage mechanism which consists of a rod movable in the supporting structure. When the rod is moved to its up position, the brake feet engage the floor and when its rod is moved to the down position, the brake feet are held above the floor.

The tie-down mechanism includes two tie-down locks which are longitudinally spaced apart to form a tie-down space and are pivotally mounted on the support structure to rotate in opposite directions. Thus, the tie-down mushroom can engage, rotate and move past either tie-down lock into the space between the locks so that the tie-down mechanism can be operated by movement of either end of the cart over the mushroom.

A release pedal is located at each end of the cart adjacent to the brake pedal and downward movement of a release pedal moves one of the tie-down locks and simultaneously moves the overcenter brake mechanism to move the brake feet off the floor. Thus, regardless of whether the cart is secured by the tie-down mechanism or by the brake mechanism, it is released by downward foot movement of one of the release pedals. Normally, the brakes would not be applied when the cart is being held by a tie-down mushroom.

The present invention therefore provides a tie-down and brake mechanism which can hold the cart in two different modes of restraint by using a tie-down mushroom in the galley and a brake when in the aisle. The holding elements of the brakes and tie-down are located on a central support structure below the bottom of the cart. Because of the separation of the brake feet in both the longitudinal and transverse direction, the cart is exceedingly stable against tipping forces applied to the cart.

BRIEF DESCRIPTION OF THE DRAWINGS

FIG. 2 is a side elevational view along line 2—2 of FIG. 1 showing the brake arms in the non-braking position;

FIG. 3 is a side elevational view similar to FIG. 2 showing the braking arms in the braking position;

FIG. 4 is a vertical section along line 4—4 of FIG. 1 showing the linkages for the brake mechanism and the tie-down mechanism;

FIG. 5 is a sectional view similar to FIG. 4 showing the brake linkage in the braking position and the tie-down mechanism in its normal position;

FIG. 6 is a sectional view similar to FIG. 4 showing the brake mechanism in non-braking position and one of the tie-down locks released.

FIG. 7 is a sectional view similar to FIG. 6 showing the overcenter mechanism rod in position for continued movement by the overcenter spring;

BRIEF DESCRIPTION OF THE PREFERRED EMBODIMENT

Figure 1:
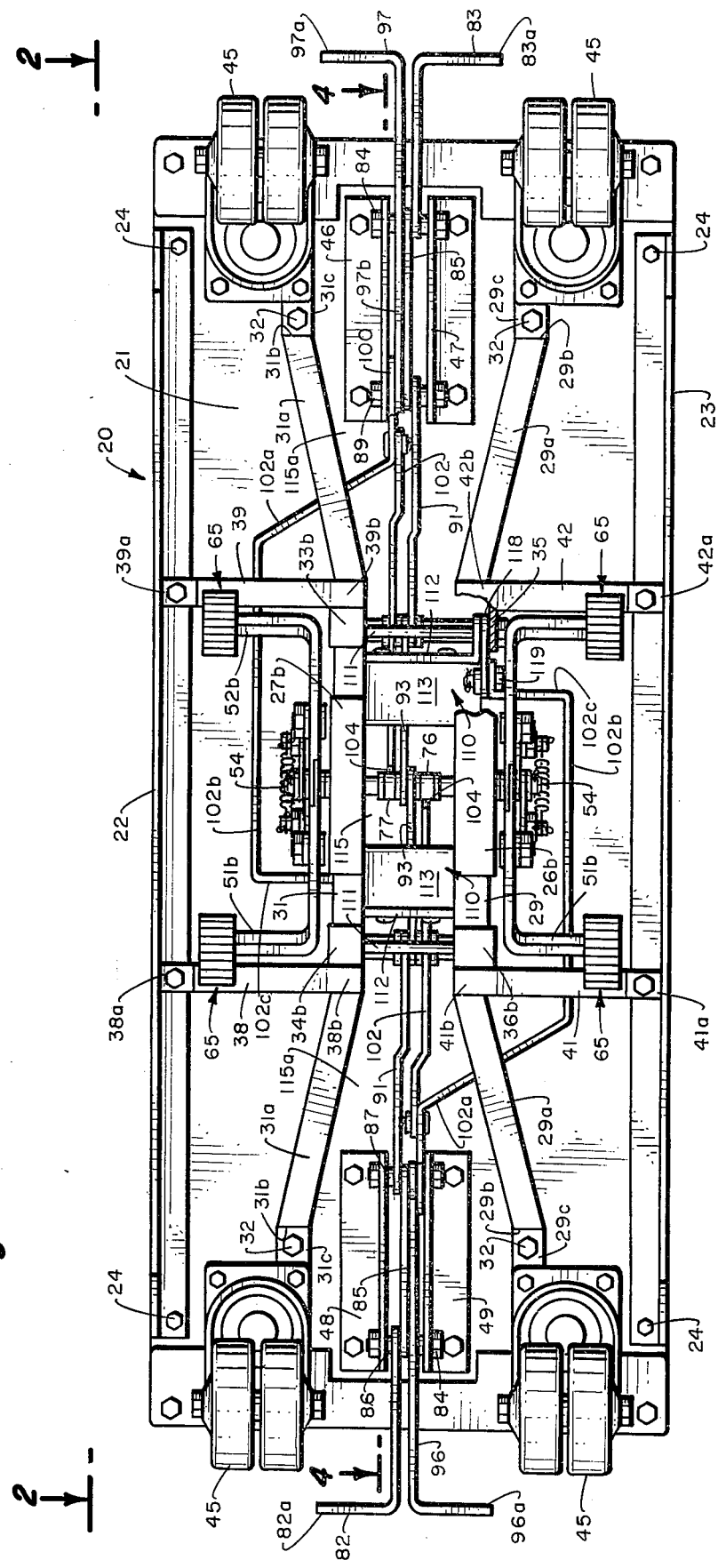
FIG. 1 is a bottom plan view taken from below the serving cart and showing the four brake arms and two tie-down locks.
Figure 8:
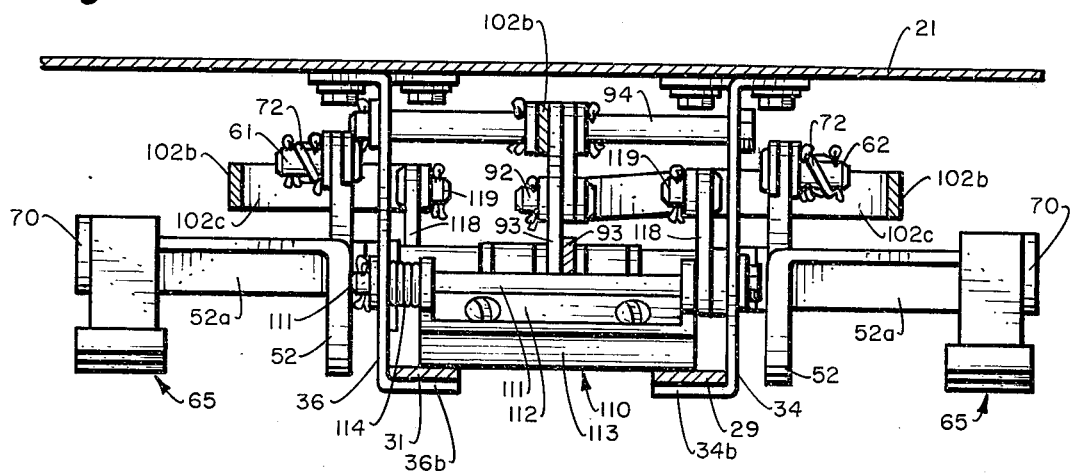
FIG. 8 is a transverse vertical section along line 8—8 of FIG. 4 showing one of the tie-down locks.

As illustrated in FIG. 1, cart 20 has a bottom panel 21, and aluminum alloy angles 22 and 23 run longitudinally along opposite side edges of the cart and are attached to the cart by bolts 24. Separate support means comprising a pair of spaced, vertical plates 26 and 27 (see FIGS. 8 and 9) are located centrally of the cart below bottom 21 and extend longitudinally of the cart. Plate 26 has a top flange 26a which is secured to the cart floor 21 by bolt 28 and has a bottom flange 26b which is welded to a longitudinally extending bar 29. In a similar manner, top flange 27a of plate 27 is secured to the bottom 21 of the cart by bolts 30 and the bottom flange 27b is welded to a bar 31 extending longitudinally of the cart.

A pair of vertical supports 33 and 34 have top flanges 33a and 34a, respectively, (see FIG. 2) which are secured to bottom 21 of the cart by suitable bolts and have lower flanges 33b and 34b, respectively, which are welded to bar 31 to hold the bar in position spaced downwardly from the bottom of the cart. Similarly, a pair of vertical supports 35 and 36 (see FIG. 4) have top flanges 35a and 36a, respectively, which are secured to the bottom 21 of the cart by suitable bolts and have lower flanges 35b and 36b welded to bar 29 to position the bar below the bottom of the cart. In addition, a pair of lateral support arms 38 and 39 are connected at one end to aluminum alloy angle 22 and extend inwardly and downwardly to the bar 31 (see FIGS. 1 and 2). The lower ends of arms 38 and 39 are welded to bar 31 to provide transverse support. In a similar manner, a pair of lateral supports 41 and 42 are connected at one end to aluminum alloy angle 23 (see FIGS. 1 and 4) and extend downwardly and inwardly to bar 29. The lower ends of arms 41 and 42 are welded to bar 29.

As illustrated in FIGS. 1 and 4, bar 29 has a straight central portion adjacent plate 26 and end portions 29a extend laterally outward and connect with leg portions 29b which extend upwardly to portions 29c which connect to the bottom of the cart by means of bolts 32. In a similar manner, the bar 31 has a straight central portion adjacent plate 27 and end portion 31a extend laterally outward and connect with leg portion 31b which extend upwardly and connect to the bottom of the cart at portions 31c by means of bolts 32. It is noted that the portions 29a and 31a define converging channels from each end of the cart which lead to the space between the upright plates 26 and 27. Double wheels 45 are pivotally attached at each corner at the bottom 21 of the cart by suitable swivel means of well known construction in order to permit the cart to be rolled along the aisle and in the galley of an airplane when the cart is not braked or attached to a tie-down lock mechanism. Also, the bottom 21 of the cart supports opposed upright extruded aluminum alloy angles 46 and 47 and opposed upright extruded aluminum alloy angles 48 and 49 which provide pivot linkage supports at the bottom of the cart for the linkage mechanism which sets the brake for the cart and for the linkage mechanism which releases the brake and the tie-down mechanism.

BRAKE MECHANISM

The braking mechanism comprises one pair of braking arms 51 and 52 pivotally mounted on plate 26 and another pair 51 and 52 pivotally mounted on plate 27. The plates 26 and 27 each contain a slot 53 through which extends a rod 54. The same reference numerals will be used for the parts of the braking linkage on each support plate since the parts are the same. Referring to FIG. 2, arms 51 and 52 are pivotally connected to supporting plate 27 by fixed pivot pins 56 and 57 which are located at substantially the apex of an angle formed by each arm. End 51a of arm 51 carries a pin 60 which pivotally connects with one end of link 61 and end 52a of arm 52 carries a pin 62 which pivotally connects to one end of a link 63. The opposite ends of links 61 and 63 connect to one end of rod 54 exteriorly of the mounting plate 27. The ends 51b and 52b of arms 51 and 52, respectively, extend laterally outwardly and each of the ends rotatably supports a brake shoe 65.

Figure 10:
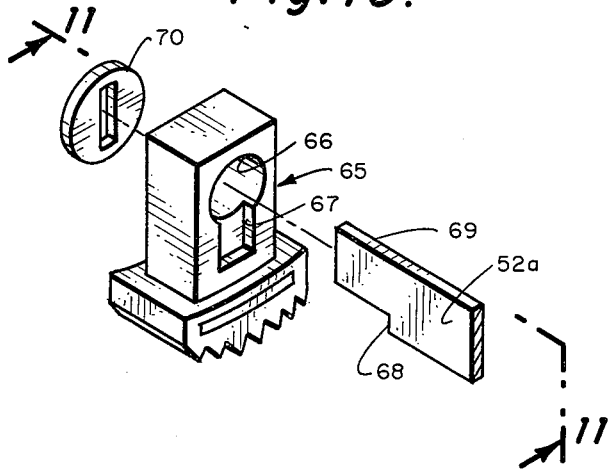
FIG. 10 is a perspective view showing the manner in which a brake foot is pivotally mounted on a brake arm.
Figure 11:
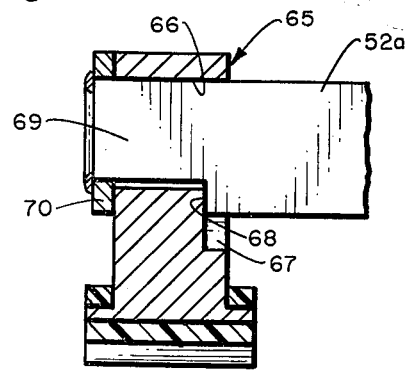
FIG. 11 is a transverse sectional view along line 11—11 of FIG. 10.

The pivotal mounting for each of the brake shoes is illustrated in FIGS. 10 and 11. Each shoe has a cylindrical opening 66 and a rectangular cutout 67 extends downward from the opening. A reduced end 69 on each brake arm is formed by a notch 68 so that the reduced end fits into opening 66 and notch 68 is received in cutout 67. A lock washer 70 receives the end 69 and is welded thereto so that washer 70 and notch 68 hold the brake shoe on end 69 and will permit the shoe to rotate an amount determined by the width of rectangular cutout 67. Because of the pivotal mounting of each of the brake shoes, it is understood that the brake shoes can adapt to slanting or uneven floor surfaces when they are moved into engagement with such surfaces.

Figure 9:
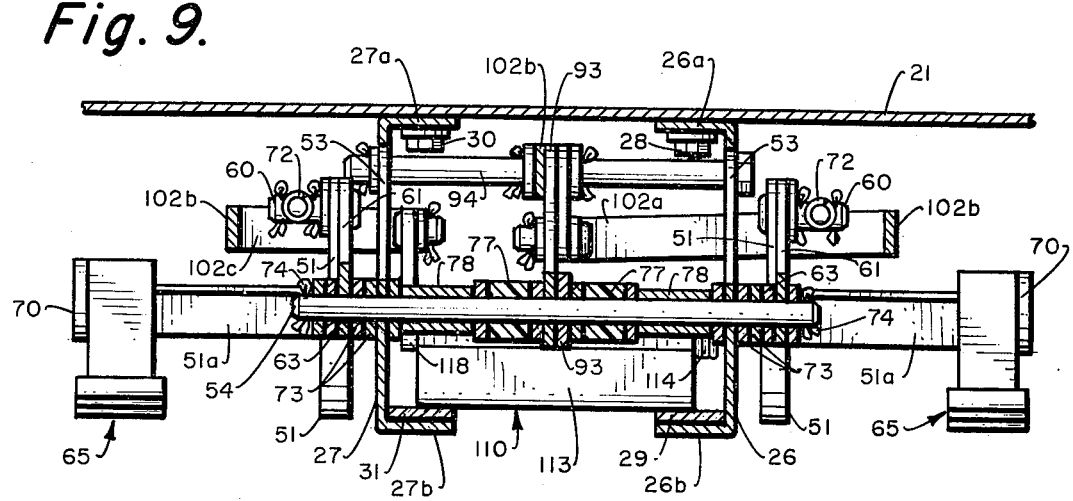
FIG. 9 is a transverse vertical section along line 9—9 of FIG. 4 showing the movable rod of the braking mechanism.

As illustrated in FIG. 2, a spring 72 extends between each pair of pins 60 and 62 in order to pull the ends 51a and 52a of the brake arms towards one another until rod 54 engages the bottom of slots 53. In this position of the brake linkage, the brake shoes 65 are all located above the floor surface and the brake is inoperative. Referring to FIG. 9, several spacers 73 are located between the plates 26 and 27 and links 61, 63, and the links 62 and 63 are secured on rod 54 by cotter pins 73. Also, two rollers 76 and 77 are located on the rod 54 by spacers 78 between the rollers and the plates. The brake actuating mechanism presently to be described connects to the rod 54 at a location between the rollers 76 and 77.

Referring to FIG. 2, when rod 54 is moved upwardly in the slots 53 past the line between pins 60 and 62, springs 72 then force the rod 54 up against the top ends of the slots 53 in the two plates. Such a change in position of the rod 54 is illustrated in FIG. 3 and it is apparent that the brake shoes 65 are forced downwardly against the supporting surface 80 in order to brake the cart. The springs 72 will maintain this condition of the linkage until the rod 54 is physically moved downward past the dead center line between pins 60 and 62, at which time the rod 54 will be moved by spring 72 to the bottom of the slots 53 and the brake arms will return to the condition of FIG. 2. Thus, the links 61 and 63, rod 54 and spring 72 comprise an overcenter mechanism for positioning the brake shoes in either surface engaging or non-engaging position.

The linkage mechanism for physically moving the rod 54 upwardly to apply the brakes is best illustrated in FIGS. 4 and 5. The upward movement of rod 54 can be accomplished by foot pedal 82 at one end of the cart or by foot pedal 83 at the other end of the cart. The linkages between each of the foot pedals and the bar 54 is identical and like numerals will be applied to like parts. Referring to foot pedal 82, it has a transverse portion 82a at one end and a right angular leg 82b at the other. A fixed pivot pin 84 is located at the apex for pivot movement of the pedal. A straight link 85 is connected by pivot pin 86 to end 82b of the pedal and the other end of link 85 is pivotally connected by a pin 87 to one end of a substantially vertical link 88. The middle of link 88 is pivoted to a fixed pivot pin 89 and a pivot pin 90 connects the other end of link 88 to a link 91. A pivot pin 92 connects link 91 to the apex of an angular link 93 which has one end connected to a fixed pivot 94 and the other end connected to the rod 54. The corresponding linkage members connected with the foot pedal 83 on the opposite end of the cart are referred to by like reference numerals. As illustrated in FIG. 9, the links 93 are both connected side by side to the rod 54 and in a position between rollers 76 and 77. It is pointed out that pivot pins 84 and 89 are supported at one cart end by angle irons 46 and 47 and at the other cart end by angle irons 48 and 49 so that the pivot pins are fixed with respect to the cart. Also, pivot pins 94 are supported between uprights 33, 34 and 35, 36 so that these pins are fixed to the cart.

When a down force is applied by the foot to the foot lever 82, the linkage just described moves to the position shown in FIG. 5. Pedal end 82b moves link 85 which rotates link 88 to move link 91 and rotates link 93 about fixed pivot 94. Rotation of link 93 moves rod 54 upwardly in the slot 53 until it passes the dead center line between pins 60 and 62 and thereafter springs 72 move the rod 54 to the top of the slots 53. Since the corresponding linkages connected with pedal 83 are connected to rod 54, these elements will move in the same manner as the elements connected to foot pedal 82 and the pedal 83 will be depressed when the pedal 82 is depressed. It is understood that the same action can be accomplished by pressing either pedal 83 or pedal 82.

Once the rod 54 reaches the tops of the slots 53, the brake shoes 65 will engage the surface 80 and brake the cart. A carpet 81 (see FIG. 5) is normally placed upon surface 80 at locations where the cart brake is utilized and generally the brake shoes 65 will sink into the pile of the carpet and the wheels 45 will just clear the carpet. However, in the case where the surface 80 is hard, as in the case of a linoleum surface, the cart will be raised slightly above the surface at one end or the other, or both, depending on the weight distribution on the cart. Generally, the shoes will move downwardly approximately one quarter inch below the bottom of the wheels.

BRAKE RELEASE MECHANISM

When it is desired to again move the cart after being braked, the braking mechanism is released by another lever system which is shown in FIGS. 5 and 6. The brake release mechanism consists of two independent linkages, one of which is operated by a pedal 96 at one end of the cart and the other of which is operated by pedal 97 at the other end of the cart. While the two linkages are identical in construction, they are not interconnected so that downward movement of pedal 96 by the foot will not move the pedal 97 and vice versa. Since the linkage elements are the same for each release pedal 96, 97, like reference numbers will be used to refer to like parts in the two linkages. The pedal 97 has a laterally extending foot 97a and is pivotally mounted intermediate its ends by pin 84 fixed to the frame. The other end 97b is pivotally connected by a pin 99 to one leg of angle link 100 which is pivoted at its apex by fixed pin 89. The other end of link 100 is pivotally connected by pin 101 to a link 102 which contains a slot 103 to receive the fixed pin 94. The end of the link 102 terminates in a slanted surface 104 which is located opposite the roller 77 on the rod 54. In a similar manner, pedal 96 has a laterally extending foot 96a (see FIG. 1) and is pivotally mounted intermediate its ends by a fixed pin 84. The other end 96b is pivotally connected by a pin 99 to the link 100 which, in turn, is connected to a link 102 having a slanted end surface 104. As illustrated in FIGS. 1 and 5, the slanted surface 104 operated by pedal 97 is spaced opposite roller 77 and the slanted surface 104 operated by pedal 96 is spaced opposite roller 76.

Referring to FIGS. 5 and 6, when foot pedal 96 is pushed downwardly with the foot, this causes movement of the lever 102 which moves slanted end 104 against roller 76. End 104 cams the bar 54 downwardly and moves it past the dead center line between pins 60 and 62. Thereafter, spring 72 moves rod 54 to its down position of FIG. 6 and raises the brake shoes 65. The lever 97 at the other end of the cart remains in the up position (see FIG. 7) since it is not interconnected with the lever 96. In the event that the attendant were at the opposite end of the cart, the lever 97 would be depressed to move slanted end 104 against roller 77 to produce the same movement of rod 54 to its down position and raise the brake shoes 65. When lever 97 is depressed, lever 96 remains in the up position. As illustrated in FIG. 1, each linkage 102 has a lateral extension portion 102a connecting with a longitudinally portion 102b which extends along the outside of a support plate. An inwardly extending portion 102c connects with a tie-down mechanism to be described. This mechanism places a spring force on portions 102c and causes either foot pedal 96 and 97 to return to its up position once the foot pressure is relieved. Thus, by the operation of either foot pedal 82 or 83, the brake shoes can be moved down to floor engaging positions and when it is desired to unbrake the cart, the braking mechanism can be unlocked by depressing either pedal 96 or 97 so that the brake shoe will move away from the support surface.

TIE-DOWN MECHANISM

As illustrated in FIGS. 1 and 4, a tie-down lock 110 is located between the pair of vertical supports 33 and 35 and another tie-down lock 110 is located between vertical supports 34 and 36. Each lock is pivotally supported on a rod 111 connected between two supports. Each of the tie-down locks consist of a bracket 112 connected to a pivot rod 111 and a rectangular side 113 extending from each bracket (see FIG. 1). A spring 114 is mounted on each rod 111 at one side of a bracket 112 in order to bias the sides 113 downwardly until they each engage the bars 29 and 31 at opposite edges. Thus, the locks 110 are normally biased into the position illustrated in FIG. 4 by the springs 114 and these locks extend across the passageway 115 between the bars 29 and 31 (see FIG. 1). The bar portions 29a and 31a form converging passages 115a leading from opposite directions to space 115.

A link 118 is connected to each bracket 112 and extends upwardly to be pivotally connected to the flanged end of link portion 102c which is located to one side of an upright support plate. As previously described, the link portion 102c moves longitudinally with link 102 when the link is moved by one of the foot pedals 96, 97. When one of these pedals is pushed downward, the link 118 farthest away is rotated about rod 111 which causes the tie-down side 113 connected to the rod to rotate upwardly. When the foot pedal pressure is relieved, the foot pedal will be returned to the up position by spring 114. In FIG. 6, the tie-down lock 110 connected to foot pedal 96 is in the raised position while the tie-down lock 110 connected to pedal 97 remains in the down position since pedal 97 is not depressed. It is understood that these levers 96 and 97 are not interconnected and operate independently of each other and that a spring 114 normally returns either pedal to horizontal position when the foot pressure is released.

Figure 12:
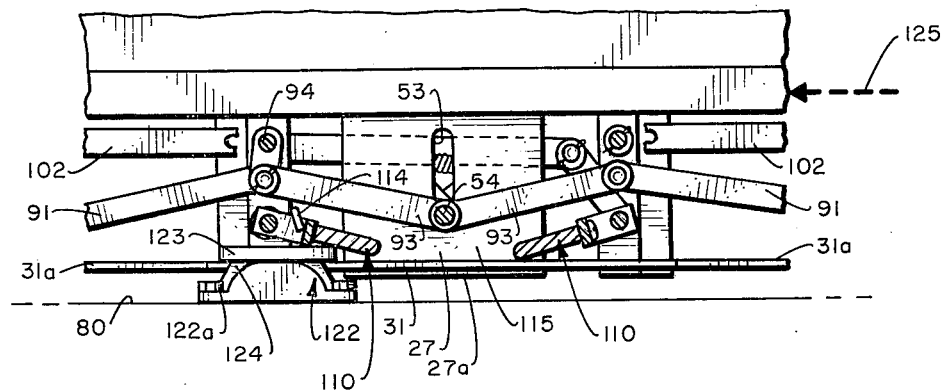
FIG. 12 is a partial sectional view similar to FIG. 4 showing a tie-down mushroom engaging a tie-down lock during entrance into the tie-down space between the locks.
Figure 13:
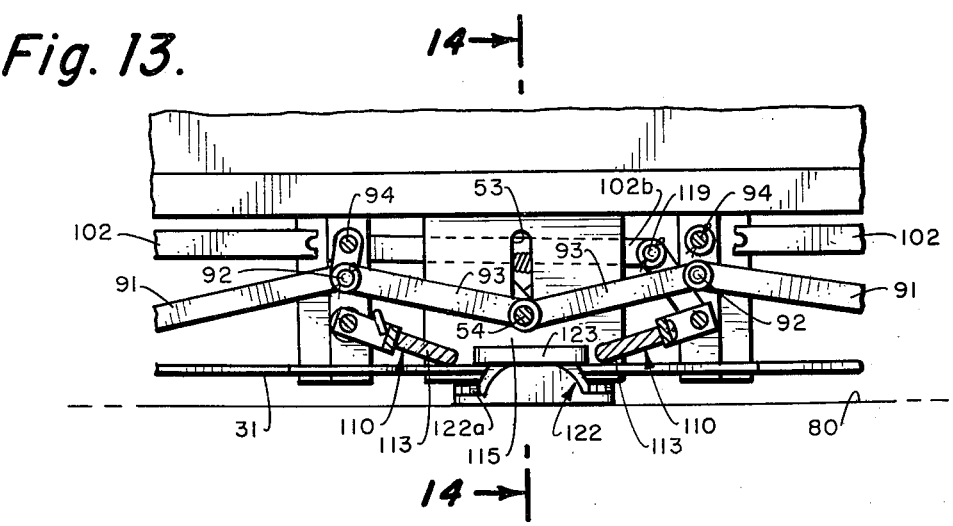
FIG. 13 is a partial sectional view similar to FIG. 4 showing the tie-down mushroom located between the two tie-down locks.
Figure 14:
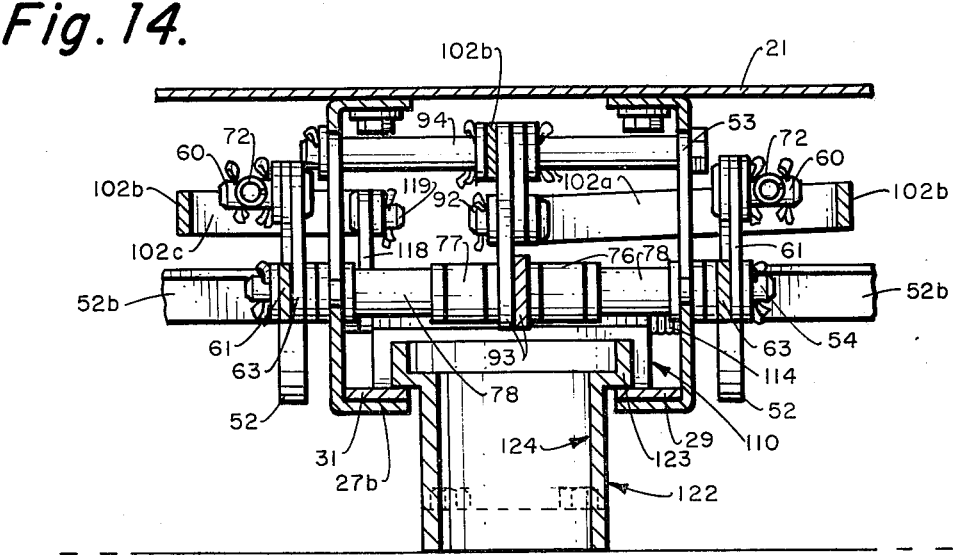
FIG. 14 is a transverse vertical section along line 14—14 of FIG. 13.

Referring to FIGS. 12 and 13, a tie-down mushroom 122 is shown attached to the floor surface 80 by means of bolts 122a. The mushroom has a top flange 123 which extends outwardly from body 124. The top flange 123 is higher than the bar portions 29a and 31a so that as the cart is pushed towards the tie-down mushroom in the direction of arrow 125 (FIG. 12), the mushroom will enter space 115a between the portions 29a and 31a. These portions will guide the mushroom into the space 115 where it will first engage a tie-down lock 110 and move it upwardly against the force of a spring 114, as illustrated in FIG. 12. Further movement of the cart will move the mushroom 22 past the lock and into the space 115 between the two locks 110. The locks will thereafter be held down against the bars 29 and 31 so that if the cart attempts to move in either direction, the mushroom will engage one of the locks 110 and will be restrained. Thus, when the brake shoes 65 are above the floor, the cart can still be held by the tie-down mushroom fixed to the floor.

Since the cart has been pushed from the right end in the direction of arrow 125, the foot pedal 97 will be closest to the attendant and actuation of pedal 97 by the foot will raise the lock 110 which was initially raised by the mushroom upon entering the space 115. Thus, the cart can be pulled back toward the attendant in the opposite direction from arrow 125 when the pedal 97 is depressed. In the event that the attendant was on the left hand side of the cart in FIG. 12, the other locking member 110 would be raised as the mushroom entered the space 115 and actuation of pedal 96 would raise this locking element and let the cart be pulled back towards the left by the attendant. During the operation of either pedal 96 or 97, it is understood that the braking mechanism would be in the non-braking condition since braking would not be required when the tie-down mushroom is in use.

It is understood that other support structures can be used to locate the brake shoes at spaced locations, both transversely and longitudinally, under the cart to provide for stability for the cart when the brake shoes engage a supporting surface. Also, other linkages can be used to apply the brake and to release the brakes and the tie-down locks. The support structure and linkages are arranged so as not to interfere with the movement of the cart onto the tie-down mushroom from either end of the cart. Also, the brake mechanism is entirely clear of the tie-down mechanism and operates exteriorly of the tie-down mechanism. The central location of the brake shoes underneath the cart provides sufficient space between the guide bars at the ends of the cart to easily receive the tie-down mushroom and guide it into the narrower space between the locks. At the same time, the brake shoes are a sufficient distance apart to impart stability to the cart.

What is claimed is:

1. A brake and tie-down mechanism for a cart movable on a support surface comprising:
   separate support means secured to the bottom of said cart and spaced apart transversely of said cart;
   a tie-down mechanism comprising a pair of tie-down locks pivotally mounted at opposite ends on said support means and spaced apart longitudinally of said cart to form a tie down space therebetween;
   said space receiving and retaining a tie-down mushroom rigidly secured to said surface in order to restrain the movement of said cart;
   brake means mounted on each of said support means comprising brake shoes selectively movable into engagements with said support surface to brake the movement of said cart;
   first lever means for moving said brake shoes into engagement with said surface;
   second lever means independent of said first lever means for moving said brake shoes away from said surface and simultaneously releasing said mushroom from said tie-down locks;
   said second lever means comprising two separate linkages, each linkage being actuated from a different end of said cart to pivot a different one of said locks to release said mushroom, said brake shoes being moved away from said surface by actuation of either of said linkages to move one of said locks;
   said first lever means being actuated from either end of said cart for moving said brake shoes into engaging position.

2. A mechanism as defined in claim 1:
   each of said locks having a locking side biased against said support means; engagement of either of said locks with said mushroom upon entering said space causing rotation of said engaged lock in one direction to permit movement of said mushroom past said lock into said space, each of said linkages being pivotally connected to one of said locks and each linkage having a cam for moving said brake shoes.

3. A mechanism as defined in claim 2 having a movable rod connected to said brake shoes for moving said brake shoes, said bar being movable by said first lever means and by either of said cams.

4. A brake and tie-down mechanism for a cart movable on a support surface comprising:
   separate support means secured to the bottom of said cart and spaced apart transversely of said cart;
   a tie-down mechanism comprising a pair of tie-down locks pivotally mounted at opposite ends on said support means and spaced apart longitudinally of said cart to form a tie down space therebetween;
   said space receiving and retaining a tie-down mushroom rigidly secured to said surface in order to retain the movement of said cart;
   brake means mounted on each of said support means comprising brake shoes selectively movable into engagements with said support surface to brake the movement of said cart;
   first lever means for moving said brake shoes into engagement with said surface;
   second lever means for moving said brake shoes away from said surface and releasing said mushroom from said tie-down locks;
   said brake means comprising a pair of brake arms pivotally connected to each said support means, one of said brake shoes being connected to one end of each brake arm;
   an overcenter mechanism connected between the other ends of each pair of brake arms;
   said first lever means moving said overcenter mechanism into position to engage said brake shoes with said surface;

said second lever means moving said overcenter mechanism into position to hold said brake shoes away from said surface in non-engaging position.

5. A mechanism as defined in claim 4 wherein said overcenter mechanism comprises an overcenter spring holding said brake shoes in either surface engaging or non-engaging position.

6. A mechanism as defined in claim 4:
said first lever means comprising two brake linkages extending from said support means toward opposite ends of said cart and each terminating in a brake foot pedal, downward movement of either of said brake pedals causing said overcenter mechanishm to engage said brake shoes with said surface.

7. A mechanism as defined in claim 4 wherein said second lever means comprises two release linkage means extending toward opposite ends of said cart and each terminating in a release foot pedal, operation of either of said release pedals causing said overcenter mechanism to disengage said brake shoes from said surface and causing movement of one of said tie-down locks to release said mushroom from said tie-down space.

8. A mechanism as defined in claim 5:
said spring being connected to the other ends of each pair of brake arms;
a pair of overcenter links each pivotally connected at one end to said other ends of said brake arms;
an overcenter rod movable in slots in said separate support means, the other ends of said overcenter links being pivotally connected to an end of said rod, the movement of said rod past the overcenter line between said other ends of said brake arms being limited by the opposite ends of said slot; and
said first lever means being pivotally connected to said rod for movement of said rod in one direction in said slot.

9. A mechanism as defined in claim 8:
said second lever means terminating in cam surfaces opposite said rod so that movement of said second lever means moves said rod in the opposite direction in said slot.

10. A mechanism as defined in claim 1 wherein said separate support means comprises a pair of support plates each secured at one edge to the bottom of said cart and extending downwardly from said cart, said plates extending longitudinally of said cart and being spaced apart transversely of said cart to pivotally mount said tie-down locks therebetween.

* * * * *